United States Patent
Shimodaira

(10) Patent No.: US 12,530,969 B2
(45) Date of Patent: Jan. 20, 2026

(54) IMAGE ANALYSIS DEVICE, IMAGE ANALYSIS SYSTEM, CONTROL METHOD OF IMAGE ANALYSIS DEVICE, AND STORAGE MEDIUM

(71) Applicant: CANON KABUSHIKI KAISHA, Tokyo (JP)

(72) Inventor: Hayato Shimodaira, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 18/490,882

(22) Filed: Oct. 20, 2023

(65) Prior Publication Data

US 2024/0153385 A1   May 9, 2024

(30) Foreign Application Priority Data

Nov. 7, 2022 (JP) .................. 2022-178284

(51) Int. Cl.
*G08G 1/14* (2006.01)
*G06T 7/70* (2017.01)
(Continued)

(52) U.S. Cl.
CPC .............. *G08G 1/146* (2013.01); *G06T 7/70* (2017.01); *G06V 20/52* (2022.01); *G08G 1/017* (2013.01);
(Continued)

(58) Field of Classification Search
CPC .... G06V 20/586; G06V 10/25; G06V 20/647; G08G 1/065; G08G 1/017; G08G 1/146; G06T 7/70; G06T 2207/30252
See application file for complete search history.

(56) References Cited

U.S. PATENT DOCUMENTS

2010/0066515 A1* 3/2010 Shimazaki ............... H04N 7/18
                                                         701/41
2013/0258107 A1* 10/2013 Delibaltov ............. G06V 20/54
                                                         348/148
(Continued)

FOREIGN PATENT DOCUMENTS

JP        2013-206462 A     10/2013

OTHER PUBLICATIONS

Extended European Search Report issued Mar. 27, 2024, in corresponding European Patent Application No. 23205808.1 (11 pages).

*Primary Examiner* — Mirza F Alam
(74) *Attorney, Agent, or Firm* — Venable LLP

(57) ABSTRACT

An image analysis device including at least one processor and a memory storing instructions that, when executed by the processor, cause the image analysis device to function as a calculating device to calculate a determination area having a hexahedral shape used to determine a parking situation of vehicles in a parking lot including a plurality of parking areas from an image for each parking area and to determine a parking situation for each of the plurality of parking areas on a basis of the determination area, parking lot information on a neighboring relationship between the parking areas, and weighting information for weighting each of four surfaces adjacent to the neighboring parking areas, based on a parking situation of a parking area neighboring the parking area corresponding to the determination area.

15 Claims, 17 Drawing Sheets

(51) Int. Cl.
*G06V 20/52* (2022.01)
*G08G 1/017* (2006.01)
(52) U.S. Cl.
CPC .................. *G06T 2207/30252* (2013.01); *G06V 2201/08* (2022.01)

(56) References Cited

U.S. PATENT DOCUMENTS

| | | |
|---|---|---|
| 2019/0147243 A1 | 5/2019 | Ono |
| 2020/0117926 A1* | 4/2020 | Kim ........................ G08G 1/143 |
| 2021/0074159 A1* | 3/2021 | Seo ......................... G06T 19/20 |
| 2022/0297676 A1* | 9/2022 | Suzuki ................ B60W 60/005 |

* cited by examiner

FIG. 8A

Parking lot information ~801

| Parking area ID | Parking situation | Vertex coordinates | | | | Neighboring parking area | | | |
|---|---|---|---|---|---|---|---|---|---|
| | | Vertex 1 | Vertex 2 | Vertex 3 | Vertex 4 | Side 1 | Side 2 | Side 3 | Side 4 |
| 1 | Vacant | 2 | 3 | 4 | 5 | 5 | No | No | 2 |
| 2 | Parked | 1 | 2 | 5 | 6 | 6 | 1 | No | 3 |
| ... | | | | | | | | | |

FIG. 8B

| Vertex ID | x coordinate | y coordinate | |
|---|---|---|---|
| 1 | 120 | 100 | ~821 |
| 2 | 140 | 110 | ~822 |
| 3 | 150 | 120 | ~823 |
| 4 | 130 | 140 | ~824 |
| 5 | 110 | 130 | ~825 |
| 6 | 100 | 110 | ~826 |
| ... | | | |

Vertex information ~802
827  828  829

FIG. 10

| Vacancy number | Indetermination number | Minimum coordinate value | Sequence | |
|---|---|---|---|---|
| 2 | 2 | 90 | 2 | ~1001 |
| 3 | 1 | 100 | 1 | ~1002 |
| 2 | 1 | 110 | 3 | ~1003 |

1011  1012  1013  1014

WEIGHTING INFORMATION

DETERMINATION SCORE =

CALCULATION OF DETERMINATION SCORE

RESULT OF VEHICLE DETECTION

IMAGE ANALYSIS DEVICE, IMAGE ANALYSIS SYSTEM, CONTROL METHOD OF IMAGE ANALYSIS DEVICE, AND STORAGE MEDIUM

CROSS-REFERENCE TO PRIORITY APPLICATION

This application claims the benefit of Japanese Patent Application No. 2022-178284, filed on Nov. 7, 2022, which is hereby incorporated by reference herein in its entirety.

BACKGROUND OF THE INVENTION

Field of the Invention

The present invention relates to an image analysis device, an image analysis system, a control method of an image analysis device, and a storage medium.

Description of the Related Art

In the related art, there is a need to detect whether there is a vehicle (for example, an automobile) parked in each individual parking area of a parking lot in order to ascertain a degree of congestion or a vacant situation of the parking lot. A method of detecting an object by installing a vehicle detection device, such as an infrared sensor, is known as a method of detecting whether there is a vehicle parked in each individual parking area.

However, such a vehicle detection device is limited in a detection range in general, and there is concern about a large increase in the number of vehicle detection devices installed in a large-scale parking lot. On the other hand, a method of detecting whether a vehicle is parked in a parking area by imaging the parking area with a camera and performing image processing on the captured image is known as another method of detecting whether there is a vehicle parked in each individual parking area.

This method provides merit in that whether there is a vehicle parked in a plurality of parking areas can be detected using an image captured by one camera by imaging the plurality of parking areas.

In determining whether a vehicle is parked using the image, a range with a likelihood of presence of a vehicle in the image may be estimated as a hexahedral three-dimensional shape and a vehicle may be detected using an area of the three-dimensional shape in the image. However, when a vehicle is parked in a neighboring parking area at this time, this vehicle is reflected in the three-dimensional shape corresponding to a side part of a vehicle of the three-dimensional shape.

In this case, even when no vehicle is parked in a certain parking area, it may be determined that there is a vehicle parked in the parking area due to a vehicle parked in a neighboring parking area. With this problem, in technology described in Japanese Patent Laid-Open No. 2013-206462, whether a vehicle is parked is determined on a basis of a degree of influence of an area of a three-dimensional shape in which a neighboring vehicle is reflected in order to reduce an influence of a neighboring parking area.

However, in the technology described in Japanese Patent Laid-Open No. 2013-206462, a case in which it has been already determined whether a vehicle is parked in a neighboring parking area is not considered.

Therefore, one of objects of the present invention is to provide an image analysis device that can improve determination accuracy of a parking situation by performing parking determination in consideration of whether a vehicle is parked in a neighboring parking area.

SUMMARY OF THE INVENTION

According to one aspect, the present invention provides an image analysis device including at least one processor or circuit configured to function as a determination area calculating unit configured to calculate a determination area used to determine a parking situation of vehicles in a parking lot including a plurality of parking areas from an image for each parking area and a determining unit configured to determine a parking situation for each of the plurality of parking areas on a basis of the determination area, parking lot information on a neighboring relationship between the parking areas, and weighting information for weighting based on a parking situation of a parking area neighboring the parking area corresponding to the determination area.

Further features of the present invention will become apparent from the following description of embodiments with reference to the attached drawings.

BRIEF DESCRIPTION OF THE DRAWINGS

FIGS. 8A and 8B are diagrams illustrating an example of parking lot information and vertex information according to the first embodiment.

FIG. 10 is a diagram illustrating an example of a degree of priority according to the first embodiment.

DESCRIPTION OF THE EMBODIMENTS

Hereafter, with reference to the accompanying drawings, favorable modes of the present invention will be described using Embodiments. In each diagram, the same reference signs are applied to the same members or elements, and a duplicate description will be omitted or simplified.

First Embodiment

Figure 1:
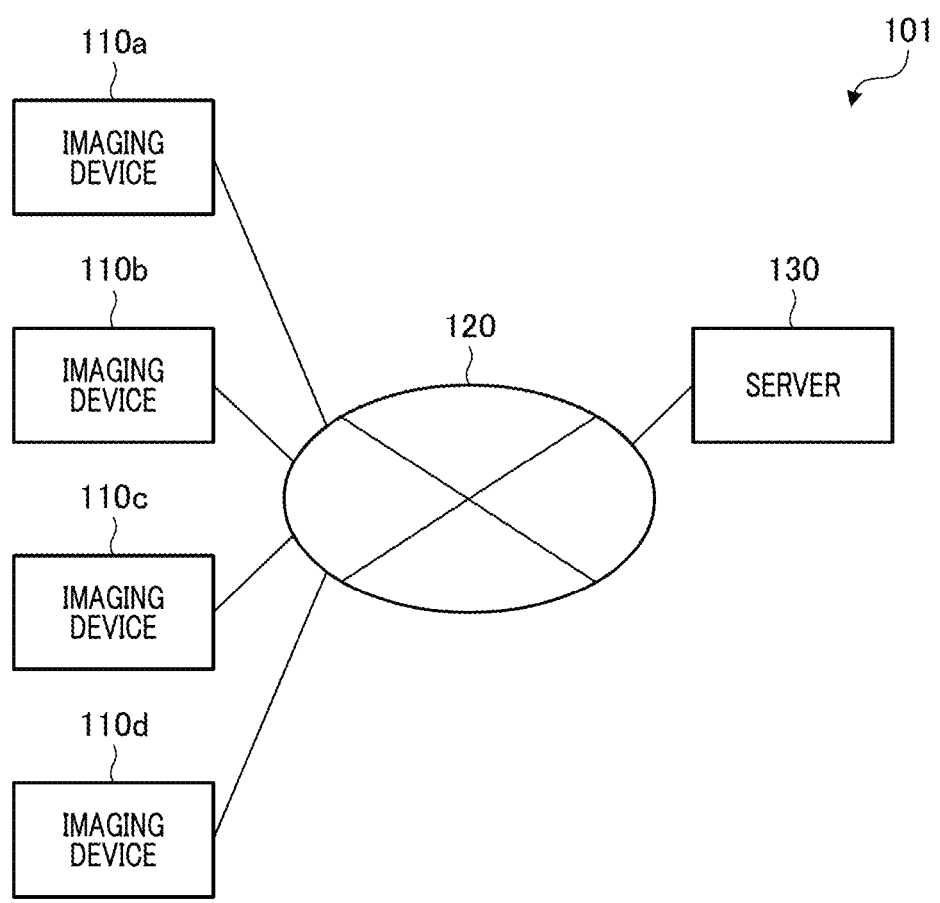
FIG. 1 is a diagram illustrating an example of a configuration of an image analysis system according to a first embodiment.

FIG. 1 is a diagram illustrating an example of a configuration of an image analysis system 101 according to a first embodiment. The image analysis system 101 according to the present embodiment will be described below with reference to FIG. 1. For example, it is assumed that this system is a parking situation determination system. The present invention is not limited thereto and the system according to the present embodiment also can be applied to an arbitrary system that analyzes an image and outputs predetermined information.

The image analysis system 101 includes an imaging device 110a, an imaging device 110b, an imaging device 110c, an imaging device 110d, a network 120, and a server 130. In the present embodiment, four imaging devices are provided as the imaging devices, but this is only an example and the number of imaging devices is arbitrary.

The imaging devices 110a to 110d are arranged such that at least one of an installation position and an installation angle vary for each imaging device. In the following description, the imaging devices 110a to 110d are also referred to as an "imaging device 110."

The imaging device 110 is an imaging mechanism such as a network camera or a monitoring camera that can image a subject. In the present embodiment, the imaging device 110 includes at least an arithmetic operation device that can process a still image (an image frame) or a video (a moving image) and transmit the image or the video to the server 130.

The imaging device 110 may not include an arithmetic operation device, and an external device (an information processing device) such as a personal computer (PC) connected to the imaging device 110 may control the imaging device 110.

A combination thereof may be handled as the imaging device 110. In the present embodiment, the imaging device 110 captures a still image or a video of a parking lot including one or more parking areas (vehicle spaces) and acquires the captured still image or video.

The server 130 is a computer such as a PC and is an image analysis device (an information processing device) having functions for an image analyzing process, image processing, or the like. The server 130 according to the present embodiment is configured to receive an input from a user and to output information to the user (for example, display information). The imaging device 110 and the server 130 are communicatively connected to each other via the network 120.

The network 120 includes, for example, a plurality of routers, switches, and cables satisfying a communication standard such as Ethernet (registered trademark). In the present embodiment, the network 120 may be an arbitrary network enabling communication between the imaging device 110 and the server 130, and can be constructed with an arbitrary scale or configuration and a communication standard supported thereby.

For example, the network 120 may be the Internet, a wired local area network (LAN), a wireless LAN, or a wide area network (WAN).

The network 120 is configured to enable communication with a communication protocol, for example, based on the open network video interface forum (ONVIF) standard. The present invention is not limited thereto, and the network 120 may be configured to enable communication, for example, with another communication protocol such as an independent protocol.

(Configuration of Imaging Device)

Figure 2:
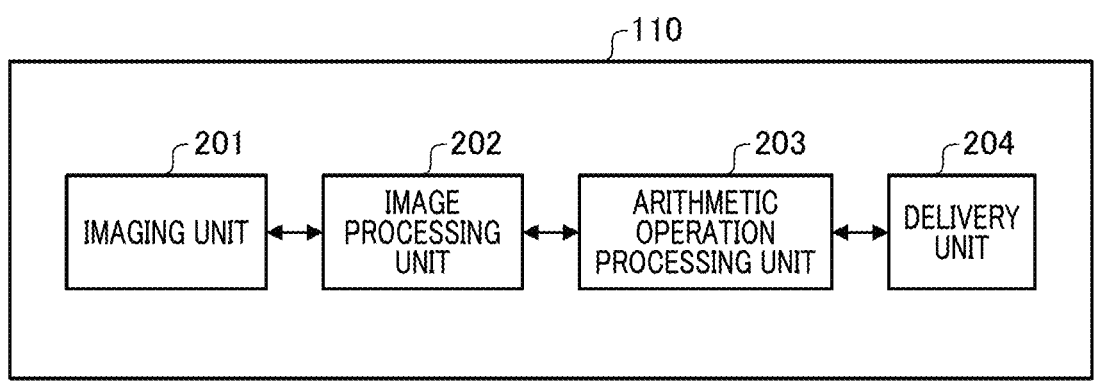
FIG. 2 is a diagram illustrating an example of a hardware configuration of an imaging device according to the first embodiment.

The configuration of the imaging device 110 will be described below with reference to FIG. 2. FIG. 2 is a diagram illustrating an example of a hardware configuration of the imaging device 110 according to the present embodiment. The imaging device 110 includes an imaging unit 201, an image processing unit 202, an arithmetic operation processing unit 203, and a delivery unit 204 as hardware constituents.

In the present embodiment, the imaging device 110 serves as an imaging unit imaging (shooting) a parking lot including a plurality of parking areas and acquiring an image.

The imaging unit 201 includes a lens unit for focusing light and an imaging element for converting the focused light to an analog signal. The lens unit has a zoom function of adjusting a viewing angle and an iris function of adjusting an amount of light.

The imaging element has a gain function of adjusting sensitivity when light is converted to an analog signal. This function is adjusted on the basis of a set value delivered from the image processing unit 202. The analog signal acquired by the imaging unit 201 is converted to a digital signal by an analog-digital conversion circuit and transmitted (delivered) as an image signal to the image processing unit 202.

The image processing unit 202 includes an image processing engine and peripheral devices thereof. The peripheral devices include, for example, a random access memory (RAM) and drivers of interfaces (I/F). The image processing unit 202 generates image data, for example, by performing image processing such as a developing process, a filtering process, a sensor correcting process, or a noise reducing process on the image signal acquired from the imaging unit 201.

The image processing unit 202 can transmit set values to the lens unit or the imaging element and perform exposure adjustment such that an appropriately exposed image can be acquired. The image data generated by the image processing unit 202 is transmitted (delivered) to the arithmetic operation processing unit 203.

The arithmetic operation processing unit 203 includes one or more processors such as a CPU or an MPU, a memory such as a RAM or a ROM, and I/F drivers. CPU is an abbreviation of Central Processing Unit. MPU is an abbreviation of Micro Processing Unit. RAM is an abbreviation of Random Access Memory, and ROM is an abbreviation of Read Only Memory.

The delivery unit 204 includes a network delivery engine and peripheral devices such as a RAM and an ETH PHY module. The ETH PHY module is a module for performing processes of physical (PHY) layers of Ethernet (registered trademark).

The delivery unit 204 converts image data or processing result data acquired from the arithmetic operation processing unit 203 to a format in which data can be delivered to the network 120 and outputs the post-conversion data to the network 120. The delivery unit 204 also serves as a transmission unit when the post-conversion data is output to the network 120. The delivery unit 204 may be configured to establish direct connection to the server 130 and to communicate with the server 130 without using the network 120 or another device.

Figure 3:
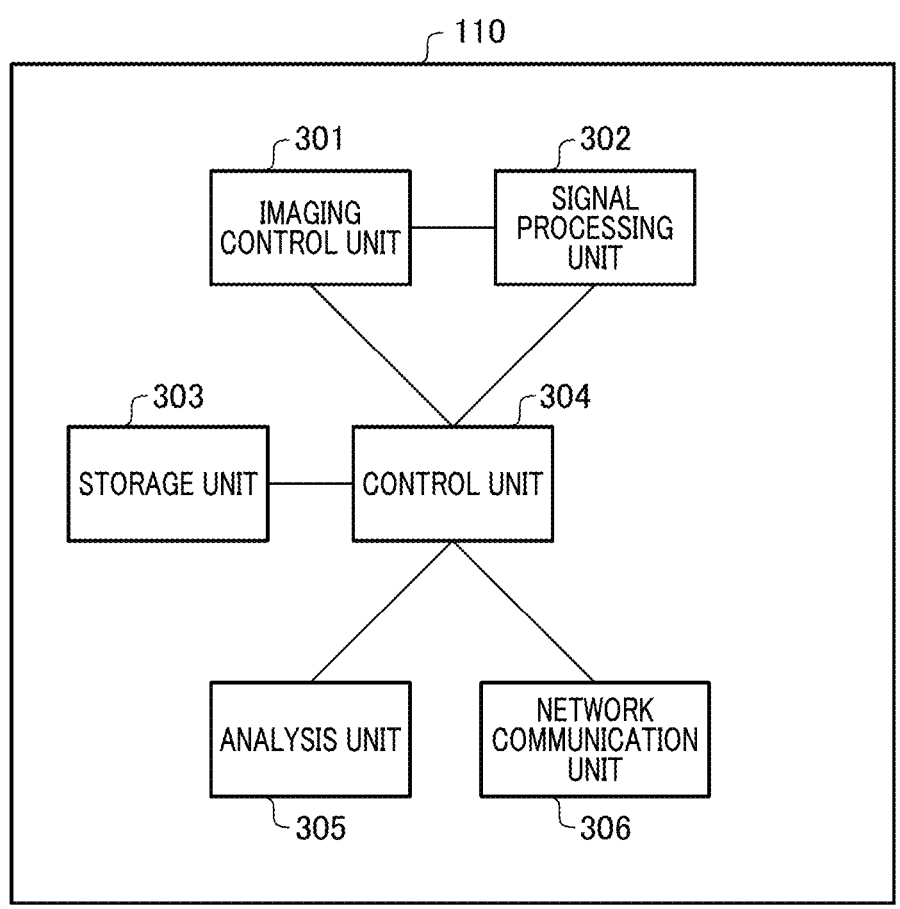
FIG. 3 is a diagram illustrating an example of a functional configuration of the imaging device according to the first embodiment.

FIG. 3 is a diagram illustrating an example of a functional configuration of the imaging device 110 according to the present embodiment. The imaging device 110 includes, for example, an imaging control unit 301, a signal processing unit 302, a storage unit 303, a control unit 304, an analysis unit 305, and a network communication unit 306 as functions thereof.

The imaging control unit 301 performs control of various operations at the time of imaging such that a surrounding environment (area) is imaged (shot) using the imaging unit 201.

The signal processing unit 302 generates data of a captured image (a shot image) by performing predetermined processing on an image (a still image) captured by the imaging control unit 301. In the following description, the data of a captured image is simply referred to as a "captured image." For example, the signal processing unit 302 encodes an image captured by the imaging control unit 301.

The signal processing unit 302 encodes a still image, for example, using an encoding system such as the Joint Photographic Experts Group (JPEG) system. The signal processing unit 302 encodes a moving image, for example, using an encoding system such as the H.264/MPEG-4 AVC system (hereafter referred to as "H.264") or the High Efficiency Video Coding (HEVC) system.

The signal processing unit 302 may encode an image, for example, using an encoding system selected by a user using an operation unit (not illustrated) of the imaging device 110 out of a plurality of preset encoding systems.

The storage unit 303 stores temporary data in various processes, or the like. The control unit 304 controls the signal processing unit 302, the storage unit 303, the analysis unit 305, and the network communication unit 306 such that they perform predetermined processes. The analysis unit 305 performs an image analyzing process on a captured image. The network communication unit 306 communicates with the server 130 via the network 120.

(Configuration of Server)

Figure 4:
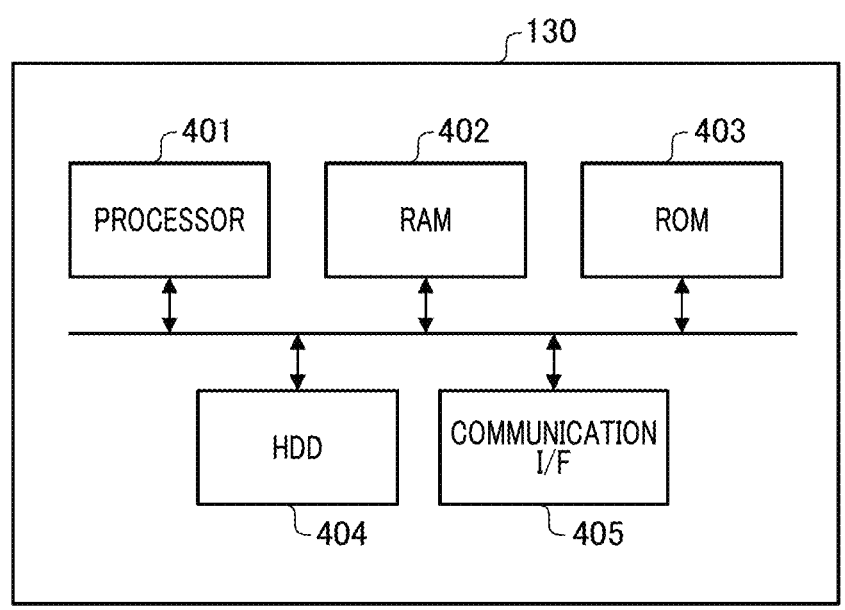
FIG. 4 is a diagram illustrating an example of a hardware configuration of a server according to the first embodiment.

FIG. 4 is a diagram illustrating an example of a hardware configuration of the server 130 according to the present embodiment.

As described above, the server 130 is constituted by a computer such as a PC and includes, for example, a processor 401 such as a CPU, a memory such as a RAM 402 or a ROM 403, a storage device such as an HDD 404, and a communication I/F unit 405 as illustrated in FIG. 4. The server 130 can perform various functions by causing the processor 401 to execute a program stored in the memory or the storage device.

The processor 401 is a central processing unit, performs arithmetic operations, logical determinations, and the like, for various processes, and comprehensively controls the constituents of the server 130. The RAM 402 is used as a temporary storage area such as a main memory or a work area of the processor 401.

A program memory may be realized by loading a program from an external storage device, or the like, connected to the server 130 to the RAM 402. The ROM 403 is a program memory and stores a computer program for control in the processor 401.

The HDD 404 is a hard disk for storing electronic data or programs. An external storage device may be used to play the same role. Here, the external storage device can be realized, for example, by a medium (a recording medium) and an external storage drive for realizing access to the medium.

For example, a flexible disk (FD), a CD-ROM, a DVD, a USB memory, an MO, and a flash memory are known as such a medium. The external storage device may be a server device connected thereto via the network.

The communication I/F unit 405 is an interface for connection to a detachable device and includes, for example, a power supply and an attachment mechanism such as an attachment/detachment socket for attaching or detaching the detachable device. The server 130 performs data communication with the detachable device via the communication I/F unit 405.

Figure 5:
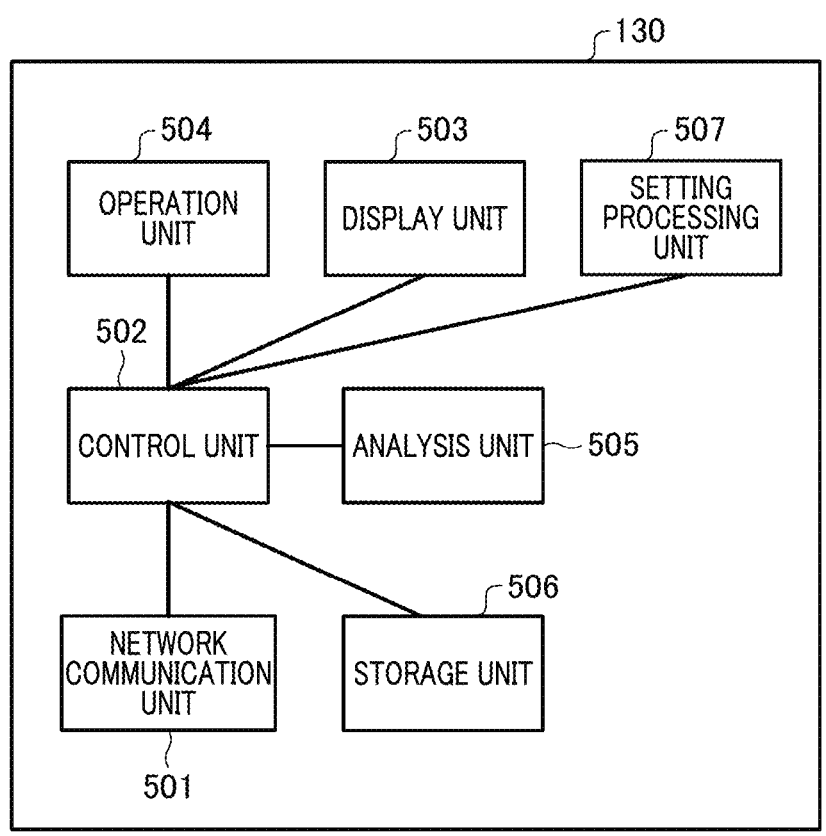
FIG. 5 is a diagram illustrating an example of a functional configuration of the server according to the first embodiment.

FIG. 5 is a diagram illustrating an example of the functional configuration of the server 130 according to the present embodiment. The server 130 includes a network communication unit 501, a control unit 502, a display unit 503, an operation unit 504, an analysis unit 505, a storage unit 506, a setting processing unit 507 as functional units thereof.

The network communication unit 501 accesses, for example, the network 120 and performs communication with an external device such as the imaging device 110 via the network 120. The network communication unit 501 also serves as a receiving unit receiving a captured image captured by the imaging device 110.

This is only an example, and the network communication unit 501 may be configured, for example, to establish direct connection to the imaging device 110 and to communicate with the imaging device 110 without using the network 120 or another device.

The control unit 502 performs control such that the network communication unit 501, the display unit 503, the operation unit 504, the analysis unit 505, the storage unit 506, and the setting processing unit 507 perform their processes.

The display unit 503 is, for example, a display device presenting information to a user via a display or a monitor. In the present embodiment, information is presented to a user by displaying a rendering result from a browser on the display. Information may be presented using a method other than display on a screen, such as vocal sound or vibration.

The operation unit 504 receives an operation from a user. In the present embodiment, it is assumed that the operation unit 504 is a mouse or a keyboard that is operated by a user to input a user operation to the browser. The present invention is not limited thereto, and the operation unit 504 may be, for example, an arbitrary device that can detect a user's intention such as a touch panel or a microphone.

The analysis unit 505 analyzes a captured image and performs various processes such as a vehicle detecting process or parking determining process that will be described later on the captured image. The analysis unit 505 performs processes such as a vehicle detecting process or a parking determining process. The control unit 502 may also serve as an analysis unit.

The storage unit 506 stores parking lot information, vertex information, and information of a result of vehicle detection that will be described later. The setting processing unit 507 performs a setting process that will be described later.

(Setting Screen)

Figure 6:
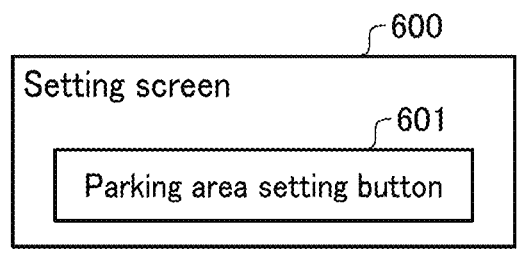
FIG. 6 is a diagram illustrating an example of a setting screen according to the first embodiment.

FIG. 6 is a diagram illustrating an example of a configuration of a setting screen 600 for performing setting associated with vehicle detection that is realized by the setting processing unit 507 of the server 130 according to the present embodiment.

The setting screen 600 includes a parking area setting button 601. When the parking area setting button 601 is pushed through a user's operation, or the like, the setting screen can transition to a screen for various settings (an editing screen). The setting screen 600 is displayed on a screen of the display unit 503 of the server 130. Setting information set via the operation unit 504 by a user is stored in the storage unit 506 of the server 130.

Figure 7:
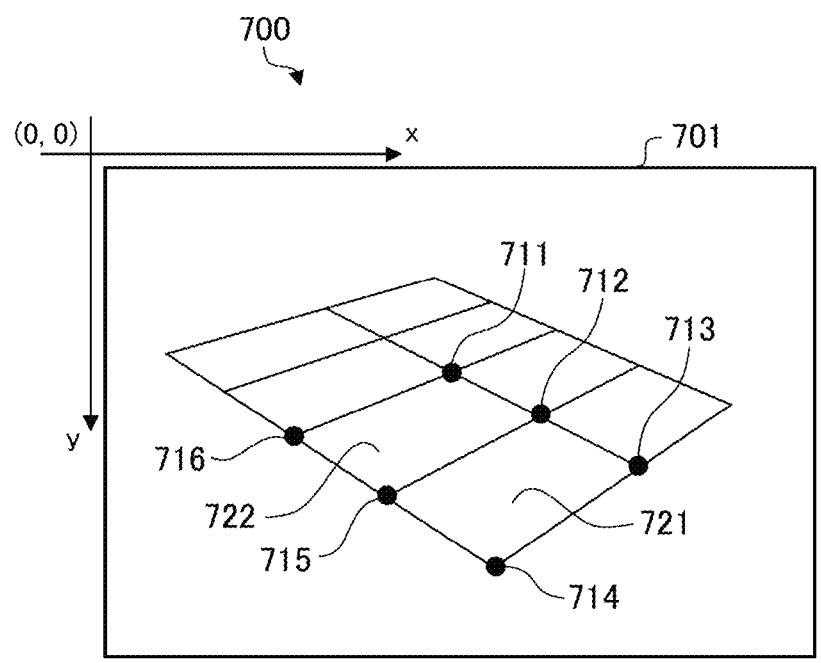
FIG. 7 is a diagram illustrating an example of a parking area setting screen according to the first embodiment.

The parking area setting button 601 is a button for transitioning to a parking area setting screen 700 for setting a parking area. FIG. 7 is a diagram illustrating an example of the parking area setting screen 700. In FIG. 7, the parking area setting screen 700 with an overhead view of a parking lot is illustrated. In the parking area setting screen 700, vertices and sides of parking areas neighboring each individual parking area are set and are stored as parking area information in a parking lot information that will be described later.

A captured image 701 is an image obtained by imaging parking areas in a parking lot. The parking area 721 and the parking area 722 are parking areas in the captured image 701. The parking area 721 includes points 712, 713, 714, and 715 that are parking lot vertex coordinates. The parking area 722 includes points 712, 712, 715, and 716 that are parking lot vertex coordinates.

In the present embodiment, individual set values associated with parking areas are referred to as parking area information, and information including all the set values is referred to as parking lot information. Set values associated with vertex coordinates used in the parking area information are referred to as vertex information. FIGS. 8A and 8B are diagrams illustrating an example of set values. FIG. 8A is a diagram illustrating an example of set values of parking lot information 801. FIG. 8B is a diagram illustrating an example of set values of vertex information 802.

The parking lot information 801 includes a parking area ID 813, a parking situation 814, vertex coordinates 815, and a neighboring parking area 816. The parking area ID 813 is an identifier for identifying a parking area. The parking situation 814 includes one parking situation out of three situations including a parked situation, a vacant situation, and an undetermined (unconfirmed) situation that is a determination result of vehicle detection which will be described later.

The parking situation 814 is set to an undetermined situation as a default value. The parked situation and the vacant situation are determined situations. The vertex coordinates 815 include four vertices with vertex IDs 827 of the vertex information 802 as elements. In the vertex coordinates 815, a vertex with a minimum Y-coordinate value out of four vertices set in the parking area setting screen 700 is defined as vertex 1, the other vertices are clockwise defined as vertex 2, vertex 3, and vertex 4, and these four vertices are stored in the storage unit 506.

The neighboring parking area 816 is an area indicating a neighboring relationship between the parking areas and includes information of parking areas neighboring the corresponding parking area to correspond to the number of sides of the parking area, that is, four. Specifically, the side connecting vertex 1 and vertex 2 out of the sides neighboring parking areas set in the parking area setting screen 700 is defined as side 1, the other sides are clockwise defined as side 2, side, 3, and side 4, and these four sides are stored in the storage unit 506.

Information of the parking area 721 on the parking area setting screen 700 corresponds to a record 811, and information of the parking area 722 corresponds to a record 812.

In the present embodiment, a user sets parking lot information by manually inputting four points surrounding a parking area while seeing the captured image 701 displayed on the screen for each of a plurality of parking areas, but the parking lot information may be able to be set.

In this case, for example, white lines of a parking area in the captured image 701 are detected using Hough transformation, and detection of a parking area is performed using crossing points of the white lines as vertices. When the parking lot information is automatically set, for example, the automatically set parking lot information may be able to be changed through a user's input.

The vertex information 802 includes a vertex ID 827, an X coordinate 828, and a Y coordinate 829. The vertex ID 827 is an identifier for identifying a vertex. The X coordinate 828 and the Y coordinate 829 indicate an X coordinate and a Y coordinate of a point on the parking area setting screen 700.

The vertex information 802 is used as vertex coordinates of the parking area information, which will be described later. Information of points 711 to 716 on the parking area setting screen 700 corresponds to records 821 to 826. The coordinate system of the vertices has the left-upper corner of the captured image 701 as an origin, and the units of the coordinates are pixels.

(Analysis Process)

Figure 9:
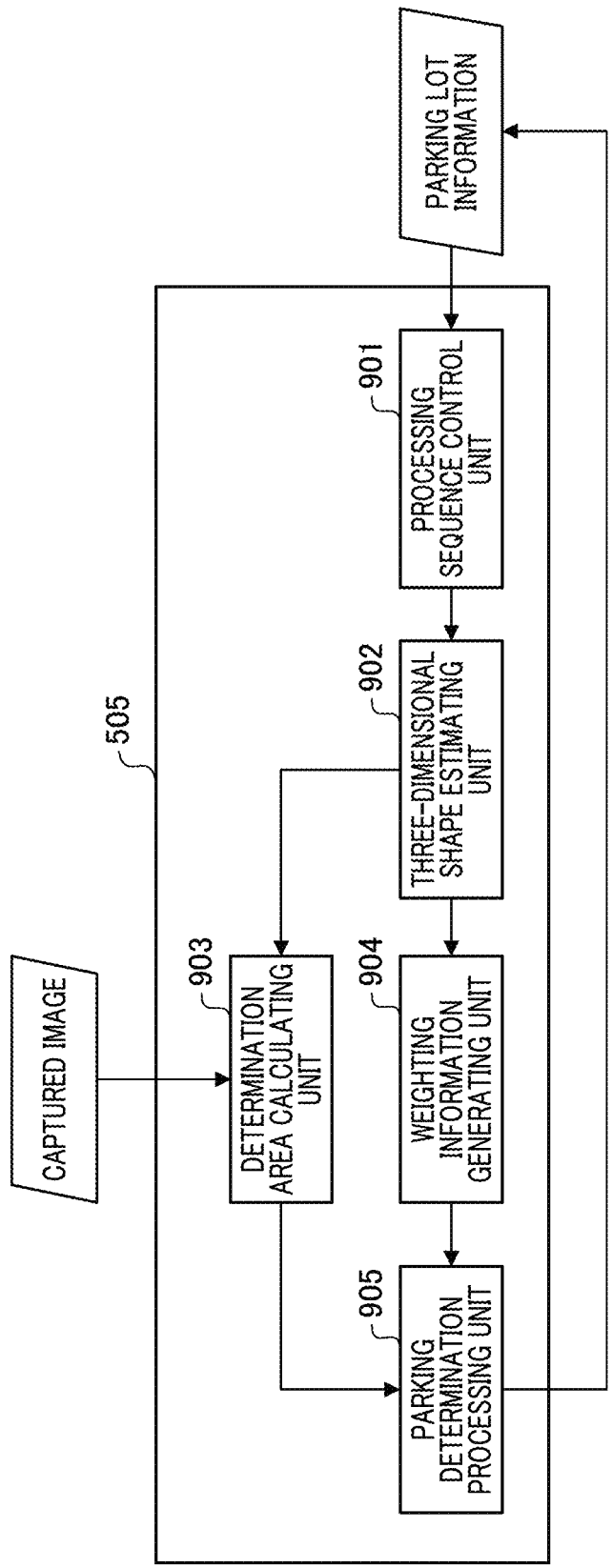
FIG. 9 is a diagram illustrating an example of a functional configuration of an analysis unit according to the first embodiment.

FIG. 9 is a diagram illustrating a structure of a parking determining process that is performed by the analysis unit 505. The analysis unit 505 includes a processing sequence control unit 901, a three-dimensional shape estimating unit 902, a determination area calculating unit 903, a weighting information generating unit 904, and a parking determination processing unit 905.

The processing sequence control unit 901 selects one parking area on which parking determination is to be performed out of parking areas of which the parking situation is undetermined from the parking lot information stored in the storage unit 506 and outputs the parking area information of the selected parking area.

The processing sequence control unit 901 first calculates a priority that will be described later for information of all the parking areas included in the parking area information and calculates a parking area with the highest priority. The priority employs a value of the parking area information of the corresponding parking area, and a parking area with a greater number of information pieces indicating that it is vacant, with a greater number of indeterminations, that is, a fewer number of parking vehicles, and with a greater Y-axis value on an image has a higher priority.

Accordingly, the priority is defined by the order of a vacancy number, an indetermination number, and a minimum Y-coordinate value, that is, the lexicographic ascending order. In the present embodiment, the processing sequence control unit 901 sets the priority of each of a plurality of parking areas as described above and controls (sets) a sequence in which parking determination of a plurality of parking areas is performed on the basis of the set priorities.

The vacancy number is information of the number of parking areas of which the parking situation is vacant out of the parking areas neighboring the corresponding parking area. The indetermination number is information of the number of parking areas of which the parking situation is undetermined out of the parking areas neighboring the corresponding parking area. The minimum Y-coordinate value indicates a positional coordinate in an image and is a minimum value out of a plurality of Y coordinates of the vertex coordinates of the corresponding parking area.

FIG. 10 is a diagram illustrating an example of the priority. Setting of the priority will be described below with reference to FIG. 10. First, since the number of vacant parking areas neighboring the parking area 1002 is the greatest through comparison of the vacancy numbers 1011 for all the parking areas, the priority of the parking area 1002 is the highest.

Then, since the parking area 1001 and the parking area 1003 have the same vacancy number 1101 of the neighboring parking areas but the parking area 1001 has a greater indetermination number 1012, the parking area 1001 out of the parking area 1001 and the parking area 1003 has a higher priority.

As a result, in the example illustrated in FIG. 10, a priority sequence of the parking area 1001, the parking area 1002, and the parking area 1003, which are three parking areas, is the sequence 1014.

The three-dimensional shape estimating unit 902 estimates a three-dimensional shape of a parking area that will be described later from the parking area information output from the processing sequence control unit 901 and outputs the parking area information and the three-dimensional shape (information of the three-dimensional shape). The three-dimensional shape is a hexahedral shape circumscribing a vehicle when the vehicle is parked in the parking area.

Regarding a three-dimensional shape, four vertices on a ceiling are calculated from four vertices on a bottom of the parking area. The coordinates of four vertices on the ceiling are calculated by setting a height on the image to half an average of lengths of four sides of the parking area and moving the Y coordinate values of four vertices downward along the Y axis. In the present embodiment, the three-dimensional shape is estimated on the basis of the lengths of four sides.

However, the present invention is not particularly limited as long as an appropriate three-dimensional shape can be estimated. For example, when an actual shape of a parking area is known, a perspective projection transformation matrix may be calculated from correspondence between a global coordinate system used to express a three-dimensional space and a screen coordinate system used to express a two-dimensional image and, then, a height on an image may be calculated.

In the present embodiment, the three-dimensional shape estimating unit 902 estimates a three-dimensional shape for each parking area as described above, and outputs the parking area information and the three-dimensional shape (information of the three-dimensional shape).

The determination area calculating unit 903 calculates and determines a partial area in a captured image (hereafter a determination area) used for parking determination in the captured image from the captured image and the three-dimensional shape output from the three-dimensional shape estimating unit 902.

The determination area calculating unit 903 outputs the determination area after determining the determination area. The determination area calculating unit 903 determines and outputs the determination area for each three-dimensional shape output from the three-dimensional shape estimating unit 902. The determination area can be a rectangular area circumscribing a group of all vertices of the three-dimensional shape.

In the present embodiment, the determination area calculating unit 903 serves as a calculating unit for calculating and determining the determination area from the three-dimensional shape output for each parking area as described above and outputting the determination area.

Figure 11:
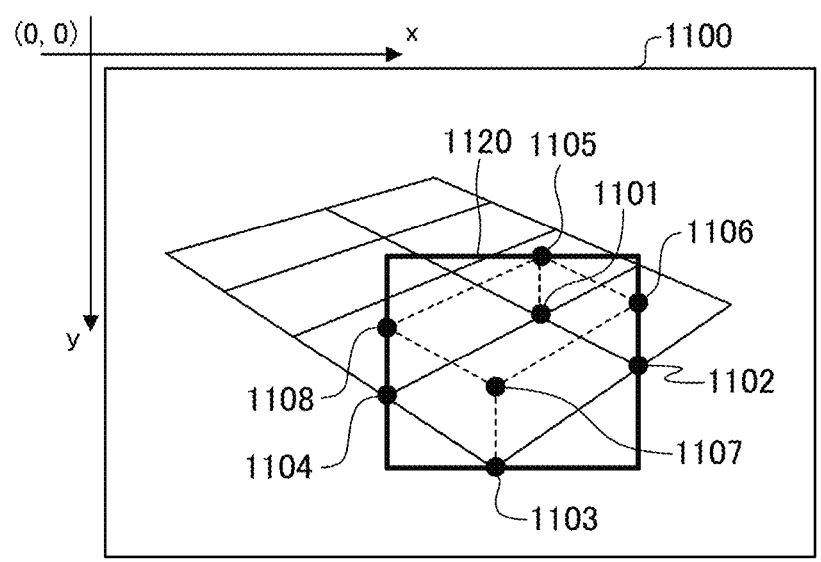
FIG. 11 is a diagram illustrating an example of a target area according to the first embodiment.

FIG. 11 is a diagram illustrating an example of a determination area 1120 that is calculated by the determination area calculating unit 903. When a three-dimensional shape including vertices 1101 to 1108 is output from the three-dimensional shape estimating unit 902, the determination area calculating unit 903 takes a rectangular shape circumscribing the three-dimensional shape and, thus, the determination area is an area of the determination area 1120 in the captured image 1100.

The determination area has been calculated and determined on the basis of the three-dimensional shape estimated by the three-dimensional shape estimating unit 902, but the determination area may be determined, for example, on the basis of information input by a user. In this case, the determination area calculating unit 903 outputs the determination area after determining the determination area as described above.

The weighting information generating unit 904 generates weighting information that is used by the parking determination processing unit 905 and, in which, whether there is a vehicle in a neighboring parking area is reflected on the basis of the three-dimensional shape output from the three-dimensional shape estimating unit 902 and the parking area information. The weighting information is information for determining that a part with a higher weight corresponding to the determination area is more important.

In four surfaces of a hexahedron with the three-dimensional shape adjacent to neighboring parking areas, a weight of 1 is set (it is weighted with 1) when the parking situation of the corresponding neighboring parking area is vacant, a weight of 0.5 is set when the parking situation of the corresponding neighboring parking area is undetermined, and a weight of 0.1 is set when the parking situation of the corresponding neighboring parking area is parked. The four surfaces adjacent to the neighboring parking areas are referred to as side surface 1, side surface 2, side surface 3, and side surface 4, sequentially, from the corresponding side of the parking area information.

The weight of an area outside of the three-dimensional shape is set to zero and the weight of an area not adjacent to the neighboring parking areas out of the areas inside of the three-dimensional shape is set to one. In the present embodiment, the weighting information generating unit 904 sets a weight based on the parking situation of the corresponding neighboring parking area for each of the surfaces adjacent to the neighboring parking areas for each parking area on the basis of the three-dimensional shape and the parking area information as described above and calculates the weighting information.

Figure 12:
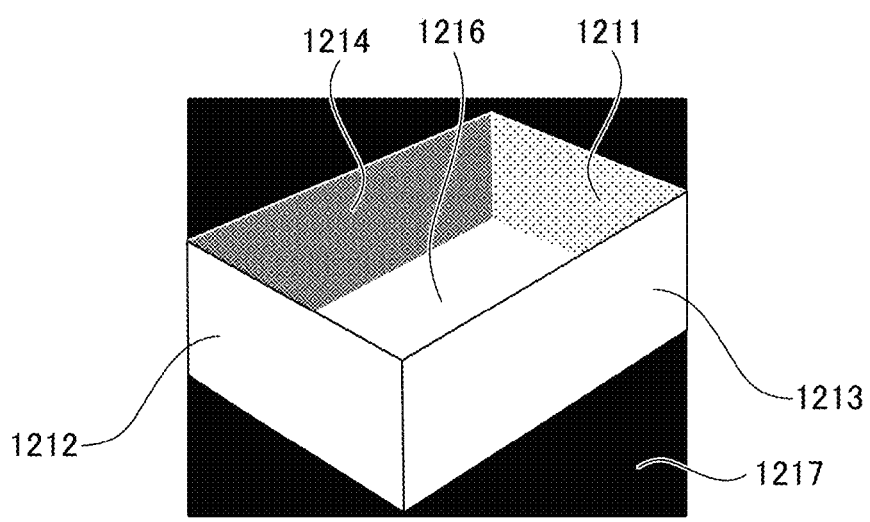
FIG. 12 is a diagram illustrating an example of weighting information according to the first embodiment.

FIG. 12 is a diagram illustrating an example of weighting information that is generated by the weighting information generating unit 904. White and black depths in FIG. 12 represent weights, and gradation from black to white corresponds to a range of weights from zero to one. The parking situation of the parking area neighboring the side surface 1211 out of the side surfaces of the three-dimensional shape is undetermined, the parking situations on the side surface 1212 and the side surface 1213 are vacant, and the parking situation on the side surface 1214 is parked.

Accordingly, the weight of the side surface 1211 is 0.5, the weights of the side surfaces 1212 and 1213 are 1, and the weight of the side surface 1214 is 0.1. The weight of an area 1216, which is a part other than the side surfaces in the three-dimensional shape is one, and the weight of an area 1217 outside thereof (an area outside of the three-dimensional shape) is zero.

In the present embodiment, the weight in the vacant situation is set to 1, the weight in the undetermined situation is set to 0.5, and the weight in the parked situation is set to 0.1. However, the present invention is not limited thereto and the weight can have a value that is higher for the vacant situation and lower for the parked situation, for example, the weight can be set to tow hundred fifty-five for the vacant situation, the weight can be set to one hundred twenty-eight for the undermined situation, and the weight can be set to one for the parked situation.

The weights in the surfaces including the side surfaces, adjacent to the neighboring parking areas, and in the other areas can be set to arbitrary values that are greater for the vacant situation and smaller for the parked situation. For example, the weights in the surfaces including the side surfaces adjacent to the neighboring parking areas and in the other areas can be set according to a size, a shape, or the like, of a parking area that is a determination target.

Since the weighting information is generated on the basis of information of the detected parking areas (results of the parking determination from the parking determination processing unit 905, which will be described later), it is possible to set an appropriate weight for each of the surfaces of the three-dimensional shape. Through a user's input, the weights in the surfaces, including the side surfaces adjacent to the neighboring parking areas, and in the other areas may be set or the preset weights may be changed.

The parking determination processing unit 905 determines whether there is a vehicle in the corresponding parking area on the basis of the weighting information output from the weighting information generating unit 904 and the determination area corresponding to the weighting information output from the determination area calculating unit 903 and updates the parking area information of the parking area.

Specifically, the parking determination processing unit 905 determines whether there is a vehicle in a target parking area on the basis of the weighting information calculated according to the parking situations of the parking areas neighboring the target parking area, that is, the parking area determined to be a determination area and the determination area.

In the present embodiment, the parking determination processing unit 905 serves as a determination unit for determining a parking situation of each parking area determined to be a determination area on a basis of the weighting information and the determination area corresponding to the weighting information as described above.

The parking determination processing unit 905 uses a classification model that has been trained using a technique called machine learning for finding a latent pattern in large data through calculation. In the present embodiment, for example, it is assumed that a classification model based on deep learning is used.

Since known techniques are used in the present embodiment, a detailed description of the classification model based on deep learning will be omitted. The parking determination processing unit 905 inputs weighting information and a target area to the classification model, determines whether a vehicle is parked in a parking area of the target area, and updates parking lot information stored in the storage unit 506 on the basis of the determination result.

(Process Flow)

Figure 13:
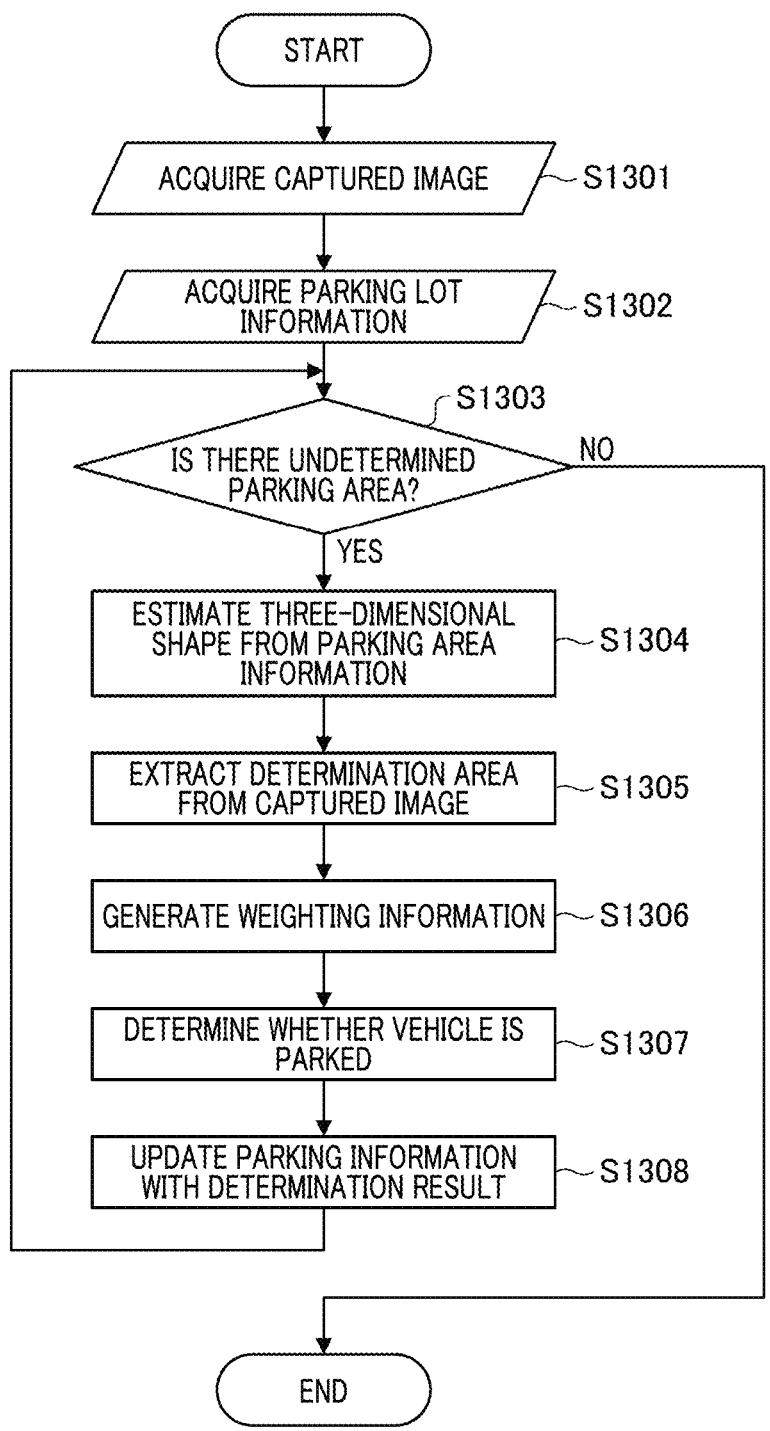
FIG. 13 is a diagram illustrating a flow of a parking determining process that is performed by the analysis unit according to the first embodiment.

A flow of processes that are performed by the image analysis system 101 according to the present embodiment will be described below with reference to FIG. 13. FIG. 13 is a diagram illustrating a flow of a parking determining process that is performed by the analysis unit 505 according to the present embodiment.

The following processes are realized by causing the processor 401 of the server 130 to execute a program stored in the RAM 402. This is only an example, and a part or all of the following processes may be realized by the imaging device 110 or dedicated hardware in addition to the server 130.

First, in Step S1301, a captured image captured by the imaging device 110 is acquired via the network communication unit 501. Thereafter, the process flow proceeds to Step S1302. Then, in Step S1302, parking lot information stored in the storage unit 506 is acquired. Thereafter, the process flow proceeds to Step S1303.

Then, in Step S1303, it is determined whether a parking area not subjected to the parking determining process remains. When it is determined that a parking area not subjected to the parking determining process does not remain, the process flow ends. On the other hand, when it is determined that a parking area not subjected to the parking determining process remains, the process flow proceeds to Step S1304.

In this process, at the time of proceeding to Step S1304, the processing sequence control unit 901 selects one parking area with a highest priority (hereafter referred to as a parking area A) out of the undetermined parking areas, and the process flow proceeds to Step S1304.

Then, in Step S1304, the three-dimensional shape estimating unit 902 estimates a three-dimensional shape of the parking area A selected in Step S1303. Thereafter, the process flow proceeds to Step S1305. Then, in Step S1305, the determination area calculating unit 903 determines a determination area used for parking determination using the three-dimensional shape of the parking area A estimated in Step S1304 from the captured image acquired in Step S1301. Thereafter, the process flow proceeds to Step S1306.

Then, in Step S1306, the weighting information generating unit 904 generates weighting information from the three-dimensional shape of the parking area A estimated in Step S1304 and the parking area A. Thereafter, the process flow proceeds to Step S1307. Then, in Step S1307, the parking determination processing unit 905 performs parking determination using the determination area determined in Step S1305 and the weighting information generated in Step S1306. Thereafter, the process flow proceeds to Step S1308.

Then, in Step S1308, a parking situation of the parking area A stored in the storage unit 506 is updated using the determination result of Step S1307. Thereafter, the process flow proceeds to Step S1303, and the same processes are repeated until a parking area not subjected to the parking determining process does not remain.

At that time, the parking determining process is performed on a parking area with a highest priority out of the parking areas not subjected to the parking determining process. A flow of the parking determining process that is performed by the image analysis system 101 according to the present embodiment has been described hitherto.

As described above, with the image analysis system 101 according to the present embodiment, parking determination using information of the already detected parking areas is performed. That is, at the time of determination of whether there is a vehicle parked in a parking area, the parking determining process is performed on a parking area with a highest priority out of one or more undetermined parking areas.

In the parking determining process, it is possible to improve determination accuracy of whether there is a vehicle in a plurality of parking areas by performing the determination based on weighting information based on parking situations (a determination situation) of parking areas neighboring a target parking area (a parking area determined to be a determination area) and the determination area.

The determination result of whether there is a vehicle parked in one or more target parking areas (the result of the parking determining process) may be displayed on the screen of the display unit 503. At the time of display on the screen of the display unit 503, for example, a screen in which parking areas and parking situations thereof can be seen with the parking lot as a two-dimensional shape may be displayed.

When the screen of a two-dimensional shape is displayed as described above, for example, an icon of a vehicle may be displayed in a parking area in which it is determined that a vehicle is parked for each parking area and an icon of a vehicle may not be displayed in a vacant parking area.

The icon to be displayed is not limited to an icon of a vehicle, and an icon of a rectangular shape or a circular shape, an arbitrary icon such as a deformed vehicle or character, or a letter may be displayed. A parking area may be emphasized to be different depending on the parked situation, the vacant situation, or the undetermined situation.

By performing this display, a user can easily ascertain the parking situation of the parking lot as a whole even when the parking areas are in any of the parked situation, the vacant situation, and the undetermined situation. At the time of performing of the display process, the processor 401 also serves as a display control unit. When the area of the parking lot is large and the whole parking lot is displayed as described above, a display screen may be reduced depending on the size of the display device.

In this case, the parking lot may be partitioned into a plurality of areas and some areas thereof may be displayed, or the partitioned areas may be displayed to be switched. The captured image, in which a determination area is displayed, as illustrated in FIG. 11, may be displayed on the screen of the display unit 503.

Modified Example 1

In the present embodiment, whenever parking determination of one parking area is performed, calculation of a priority is performed on all of undetermined parking areas in order to control the processing sequence using updated information.

Speed may have higher priority than accuracy at the time of operation. In this case, at a time point at which parking lot information has been acquired, calculation of a priority may be performed on all the parking areas and the processes may be performed in a sequence of the calculated priorities.

Modified Example 2

In the present embodiment, information in which a weight of 0.1 is set for a parked situation, a weight of 1 is set for a vacant situation, and a weight of 0.5 is set for an undetermined situation is used as the weighting information. However, when the classification model is not a model using two values indicating parked and vacant situations, but a model for outputting a parking probability in the range of zero to one, the weighting information may be generated using the output values.

Specifically, a weight has a value of a parking probability instead of the parking situation of the parking lot information stored in the storage unit 506, and 1-parking probability is used as a weight at the time of generating the weighting information. In this case, the parking situation does not need to be set to a fixed value, and a determination result of the classification model is used.

Accordingly, since the weight becomes lower as the parking situation becomes closer to a parked situation and the weight becomes greater as the parking situation becomes closer to a vacant situation, it is possible to improve accuracy of parking determination.

Second Embodiment

In the first embodiment, the classification model is used for parking determination of a parking area, but since the classification model performs the determination process on the parking areas one by one, it may take time to perform the determination process depending on the size of the parking lot, the number of parking areas, or the like.

Therefore, in the present embodiment, a method of applying an object detection model for detecting a position and a size of a vehicle in a captured image instead of using the classification model will be described below. A system configuration thereof is the same as in the first embodiment, and differences from the first embodiment will be mainly described below.

Figure 14:
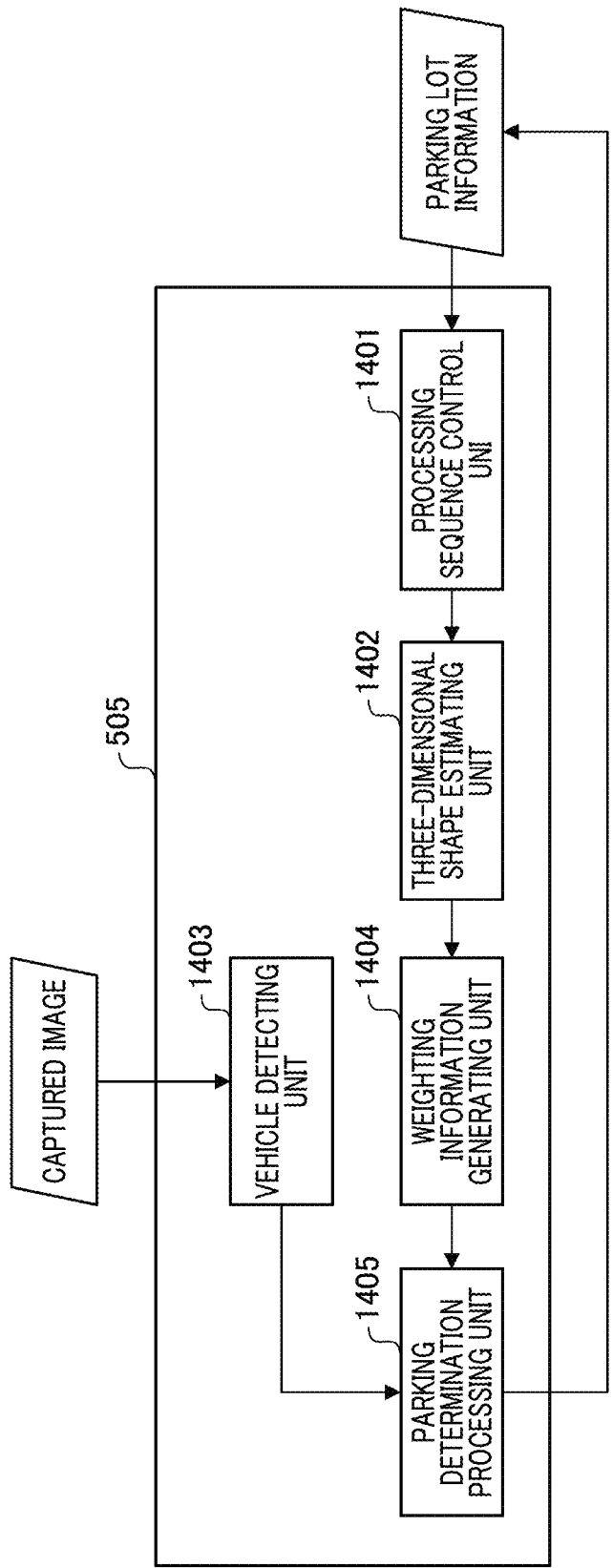
FIG. 14 is a diagram illustrating an example of a functional configuration of an analysis unit according to a second embodiment.

FIG. 14 is a diagram illustrating an example of a functional configuration of an analysis unit 505 according to the second embodiment. A processing sequence control unit 1401 performs the same process as the processing sequence control unit 901 in the first embodiment.

A three-dimensional shape estimating unit 1402 performs the same process as the three-dimensional shape estimating unit 902 in the first embodiment. A weighting information generating unit 1404 performs the same process as the weighting information generating unit 904 in the first embodiment. Accordingly, a detailed description of the processing sequence control unit 1401, the three-dimensional shape estimating unit 1402, and the weighting information generating unit 1404 will be omitted.

A vehicle detecting unit 1403 detects a position and an area (a detection area) in which a vehicle is present and a class of the vehicle (a type and a model of the vehicle) from a captured image, calculates a detection reliability thereof, and outputs the information. The area in which a vehicle is present is represented by a rectangular area with which a vehicle (an area of the vehicle) is surrounded and which is referred to as a bounding box.

This is referred to as a detected vehicle. In the second embodiment, the vehicle detecting unit 1403 detects a position at which a vehicle is present and a detection area thereof from a captured image, performs detection and determination of a vehicle model of the vehicle in the area, calculates a reliability of the detection, and outputs the detection result or the calculation result.

Examples of a class of a vehicle include a standard-sized car, a light car, a compact car, a minivan, an SUV, a truck, a bus, a trailer, a large-sized special vehicle, a small-sized special vehicle, and a motorized bicycle (a motorbike).

Examples of the large-sized special vehicle include a road roller and a bulldozer. Examples of the small-sized special vehicle include a tractor, a forklift, and a shovel loader.

When classes of vehicles (types of vehicles) can be classified more finely as described above, it is possible to enhance determination accuracy of a vehicle in a parking area. However, as the number of classes increases, a problem with a decrease in a processing speed, or the like, also occurs. Accordingly, it is preferable that appropriate classes (types) be set in view of accuracy and speed.

For example, the classes may be set to be limited to classes based on a size of a vehicle such as a light car, a standard-sized car, a minivan, or a truck or may be set to be limited to classes based on a size with which a vehicle can park in a target parking area of the parking lot. For example, vehicles may be classified into a light car and a small-sized car in consideration of displacement, a length, a width, and a height, vehicles of which at least one of the displacement, the length, the width, and the height exceeds the range of the small-sized car may be classified into a standard-sized car, and vehicles may be classified into three classes.

The detection reliability is output, for example, in a range of zero to one in which the lowest reliability is zero and the highest reliability is one. The vehicle detecting unit 1403 uses an object detection model that has been trained according to a technique called machine learning of finding a latent pattern through repeated calculation based on big data.

In the present embodiment, for example, it is assumed that an object detection model based on deep learning be used. Since known techniques are used in the present embodiment, a detailed description of the object detection model based on deep learning will be omitted.

A parking determination processing unit 1405 determines whether a vehicle is parked in a parking area by calculating a determination score that will be described later using a plurality of detected vehicles that are the detection result from the vehicle detecting unit 1403 and the weighting information generated by the weighting information generating unit 1404 and comparing the calculated determination score with a reference value.

After the determination has been performed, the parking lot information stored in the storage unit 506 is updated. In the second embodiment, the vehicle detecting unit 1403 serves as a determination unit at the time of performing the aforementioned process. The weighting information generating unit 1404, generates weighting information on the basis of the detection result from the vehicle detecting unit 1403.

The parking determination processing unit 1405 calculates the determination score for all the detected vehicles. It is determined that a corresponding detected vehicle is parked in the corresponding parking area when a highest determination score out of the calculated determination scores is greater than the reference value, and it is determined that the detected vehicle does not park in the parking area when the highest determination score is less than the reference value.

Thereafter, the parking determination processing unit 1405 has updated the parking lot information using the determination result, the detected vehicle is already assigned to the parking area and, thus, is deleted such that the detected vehicle is not assigned to another parking area. The determination score is calculated using the bounding box of the detected vehicle and the weighting information.

Here, a weight of each side part in the weighting information is defined as $W_i$ sequentially from side surface 1, an area is defined as $S_i$ (where i=1, 2, 3, and 4). When a weight of an area in a three-dimensional shape other than the side surfaces is defined as $W_0$ and an area of the bounding box is defined as $S_b$, the determination score Score is defined by Expression (1).

$$\text{score} = \frac{\sum_{i=0}^{4} W_i (S_i \cap s_b)}{\sum_{i=0}^{4} W_i S_i} \quad (1)$$

In Expression (1), $s_i \cap s_b$ denotes an area of an overlap part of the area of the side part and the area of the bounding box. The lowest determination score is zero, and the highest determination score is one. In the present embodiment, 0.5 is used as the reference value for the determination score, but the present invention is not limited thereto and an arbitrary numerical value may be used as the reference value.

Finally, the parking determination processing unit 1405 compares the determination score with the reference value, determines that the parking situation of the parking area is parked when the determination score is equal to or greater than the reference value, and updates the parking situation of the parking area information in the parking lot information in the storage unit 506. On the other hand, when the determination score is less than the reference value, the parking determination processing unit 1405 determines that the parking situation is vacant and updates the parking situation of the parking area information in the parking lot information in the storage unit 506.

Figure 15B:
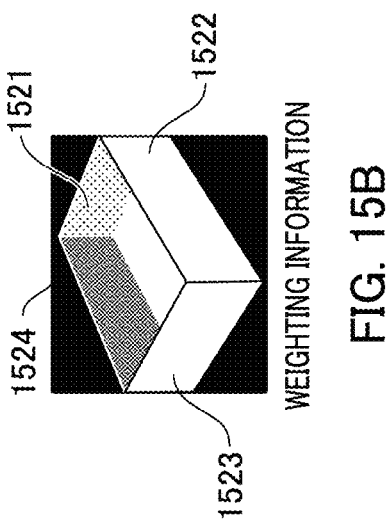
FIGS. 15A to 15C are diagrams illustrating an example of a determination score according to the second embodiment.
Figure 15C:
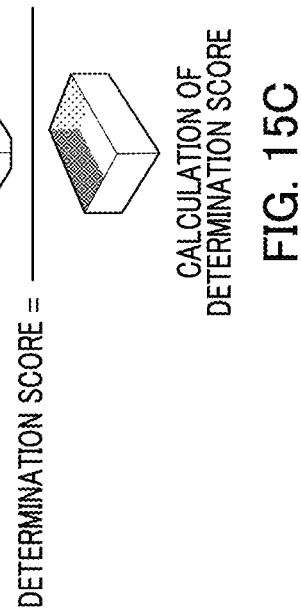
Figure 15A:
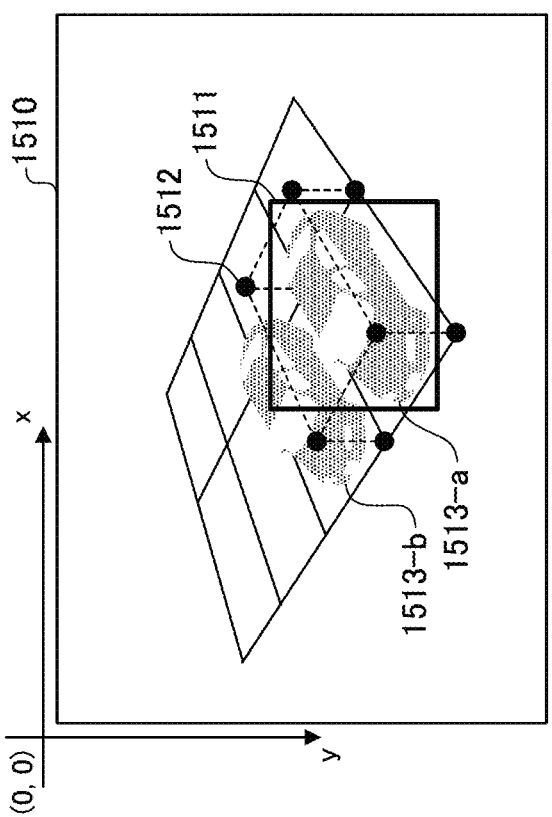

FIGS. 15A, 15B, and 15C are diagrams illustrating an example of a determination score and parking determination. FIG. 15A is a diagram schematically illustrating results from the vehicle detecting unit 1403 and the three-dimensional shape estimating unit 1402. As illustrated in FIG. 15A, vehicles park in a parking area 1513-*a* and a parking area 1513-*b* in a captured image 1510 obtained by imaging a parking lot.

The bounding box of the detected vehicle output from the vehicle detecting unit 1403 is a bounding box 1511. The three-dimensional shape output from the three-dimensional shape estimating unit 1402 is a three-dimensional shape 1512. FIG. 15B is a diagram illustrating weighting information of the parking area 1513-*a*.

In the example illustrated in FIG. 15B, the parking situation of a side surface 1521 is undetermined, the parking situations of side surfaces 1522 and 1523 are vacant, and the parking situation of a side surface 1524 is parked. FIG. 15C is a diagram schematically illustrating the determination score in the example illustrated in FIG. 15B.

(Parking Determining Process)

Figure 16:
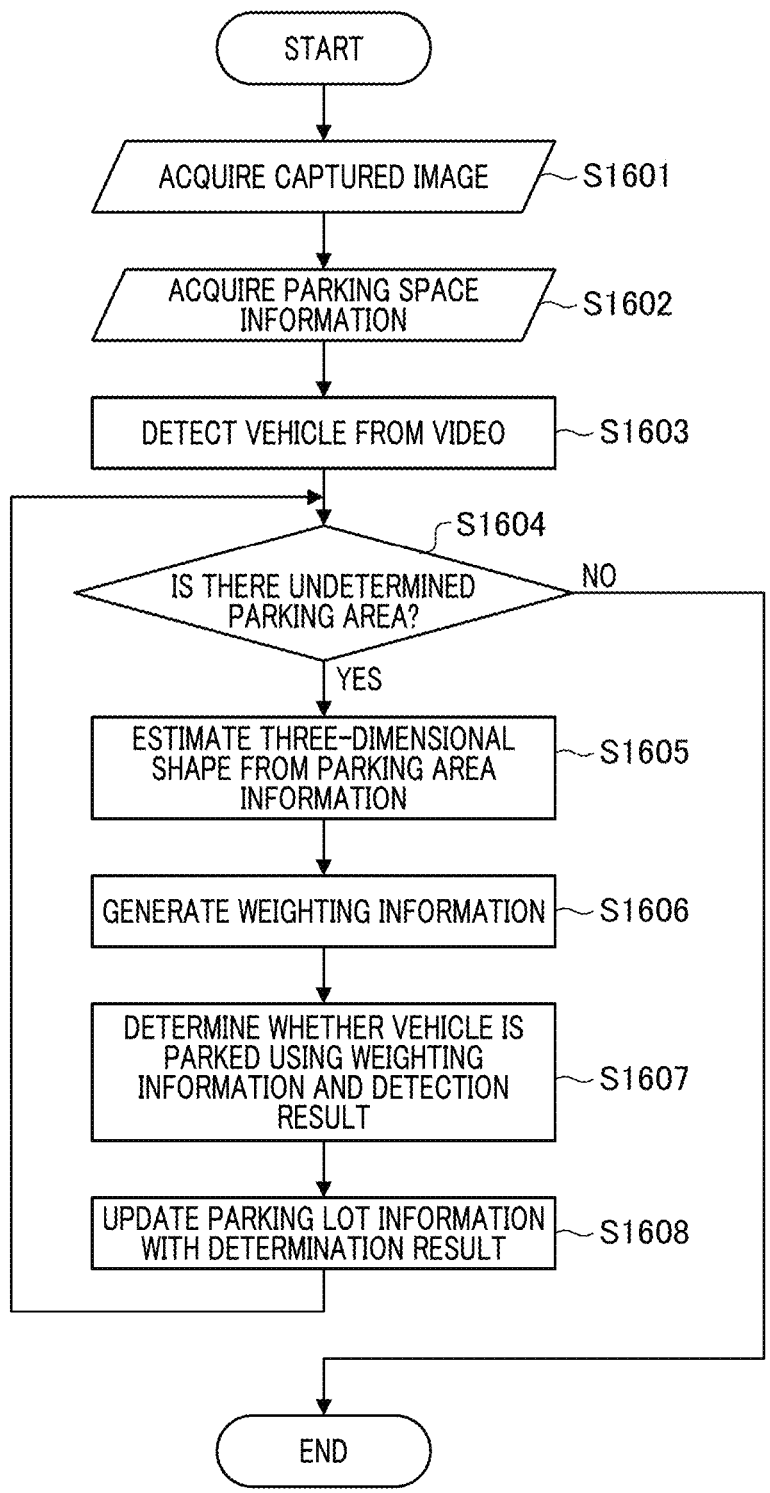
FIG. 16 is a diagram illustrating a flow of a parking determining process that is performed by the analysis unit according to the second embodiment.

A flow of processes that are performed by the image analysis system 101 according to the present embodiment will be described below with reference to FIG. 16. FIG. 16 is a diagram illustrating a flow of a parking determining process which is performed by the analysis unit 505 according to the second embodiment.

The following processes are realized by causing the processor 401 of the server 130 to execute a program stored in the RAM 402. This is only an example, and a part or all of the following processes may be realized by the imaging device 110 or dedicated hardware in addition to the server 130.

First, in Step S1601, a captured image captured by the imaging device 110 is acquired via the network communication unit 501. Thereafter, the process flow proceeds to Step S1602. Then, in Step S1602, parking lot information stored in the storage unit 506 is acquired.

Thereafter, the process flow proceeds to Step S1603. Then, in Step S1603, the vehicle detecting unit 1403 acquires a detected vehicle from the captured image acquired in Step S1601. Thereafter, the process flow proceeds to Step S1604.

Then, in Step S1604, it is determined whether a parking area not subjected to the parking determining process remains. When it is determined that a parking area not subjected to the parking determining process does not remain, the process flow ends.

On the other hand, when it is determined that a parking area not subjected to the parking determining process remains, the process flow proceeds to Step S1605. In this process, at the time of proceeding to Step S1605, the processing sequence control unit 901 selects one parking area with a highest priority (hereafter referred to as a parking area A) out of the undetermined parking areas, and the process flow proceeds to Step S1605.

Then, in Step S1605, the three-dimensional shape estimating unit 1402 estimates a three-dimensional shape of the parking area A selected in Step S1604. Thereafter, the process flow proceeds to Step S1606. Then, in Step S1606, the weighting information generating unit 1404 generates weighting information from the three-dimensional shape of the parking area A estimated in Step S1605 and the parking area A. Thereafter, the process flow proceeds to Step S1607.

Then, in Step S1607, the parking determination processing unit 1405 performs parking determination using the detected vehicle detected in Step S1603 and the weighting information generated in Step S1606. Thereafter, the process flow proceeds to Step S1608.

Then, in Step S1608, a parking situation of the parking area A stored in the storage unit 506 is updated using the determination result of Step S1607. Thereafter, the process flow proceeds to Step S1604, and the same processes are repeated until a parking area not subjected to the parking determining process does not remain.

At that time, the parking determining process is performed on a parking area with a highest priority out of the parking areas not subjected to the parking determining process. A flow of the parking determining process that is performed by the image analysis system 101 according to the present embodiment has been described hitherto.

As described above, with the image analysis system 101 according to the present embodiment, it is possible to curb an overall inference time using the object detection model in comparison with a case in which a classification model is used for each parking area. Since parking determination is performed in consideration of an influence of neighboring parking areas using information of already detected parking areas, it is possible to enhance the accuracy of the parking determination.

In the present embodiment, similar to the first embodiment, the determination result of whether there is a vehicle parked in one or more target parking areas (the result of the parking determining process) may be displayed on the screen of the display unit 503. Display details or a display format is the same as in the first embodiment and, thus, a description thereof will be omitted.

Modified Example 1

In the present embodiment, information in which a weight of 0.1 is set for a parked situation, a weight of 1 is set for a vacant situation, and a weight of 0.5 is set for an undetermined situation is used as the weighting information. However, the weighting information may be generated using a reliability of an output from the object detection model. Specifically, a weight has a value of a parking reliability instead of the parking situation of the parking lot information stored in the storage unit 506, and the reliability of a detected vehicle determined to park in the target parking area is stored therein.

At the time of generation of weighting information, 1-parking reliability is used as the weight. In this case, the parking situation does not need to be set to a fixed value, and the reliability that is an output of the object detection model is used. Accordingly, since the weight becomes lower as the reliability becomes closer to a parked situation and the weight becomes slightly greater as the reliability becomes lower such that it is not apparent that a vehicle is parked, it is possible to improve accuracy of parking determination.

Modified Example 2

In the present embodiment, only information of a target area is used to estimate a three-dimensional shape, but an actual height when a vehicle is parked actually and the estimated height may be much different from each other. The height varies depending on a vehicle type of a vehicle parking therein.

In order to reduce an influence of such a difference, the height of the target parking area and the weighting information may be corrected using class information of the detected vehicle in the results of detection and determination from the vehicle detecting unit 1403. For example, by using a value of 1 for a standard-sized car, a value of 0.8 for a light car, a value of 1.2 for a truck, and the like, as a correction value for the height at the time of estimation of a three-dimensional shape of the parking area, it is possible to correct the size of the three-dimensional shape according to the size of the detected vehicle.

By using a value of 0.1 for a standard-sized car, a value of 0.3 for a light car, a value of 0.01 for a truck, and the like, as weights of the side surfaces at the time of generation in the weighting information generating unit 1404, it is possible to reflect an influence of a size of a detected vehicle type as weighting information.

OTHER EMBODIMENTS

The present invention has been described as an example in which a captured image captured by the imaging device 110 is analyzed and processed by the server 130, but the captured image captured by the imaging device 110 may be analyzed and processed by the imaging device 110.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image analysis device through a network or various storage media. Then, a computer (or a CPU, an MPU, or the like) of the image analysis device may be configured to read and to execute the program. In such a case, the program and the storage medium storing the program configure the present invention.

The present invention includes, for example, at least one processor or circuit configured to realize the functions of the embodiments described above. The functions may be distributed and processed using a plurality of processors.

What is claimed is:

1. An image analysis device comprising:
at least one processor and a memory storing instructions that, when executed by the at least one processor, cause the image analysis device to function as:
a calculating unit configured to calculate a determination area having a hexahedral shape used to determine a parking situation of vehicles in a parking lot including a plurality of parking areas from an image for each parking area; and
a determining unit configured to determine a parking situation for each of the plurality of parking areas on a basis of the determination area, parking lot information on a neighboring relationship between the parking areas, and weighting information for weighting each of four surfaces adjacent to the neighboring parking areas, based on a parking situation of a parking area neighboring the parking area corresponding to the determination area.

2. The image analysis device according to claim 1, wherein the determining unit determines the weight for each of the four surfaces according to the parking situation of the parking area adjacent to the corresponding surface and generates the weighting information.

3. The image analysis device according to claim 1, wherein the parking lot information includes information on whether the determination on the parking situation has been performed.

4. The image analysis device according to claim 3, wherein the at least one processor is further configured to cause the image analysis device to function as a control unit configured to set a priority of each of the plurality of parking areas and to control a sequence of the plurality of parking areas to be the determination area on a basis of the priorities of the plurality of parking areas.

5. The image analysis device according to claim 4, wherein the control unit sets the priorities of the plurality of parking areas on a basis of the number of parking areas of which the parking situation is vacant, out of the parking areas neighboring a target parking area, the number and the positions of parking areas of which the parking situation has not been determined.

6. The image analysis device according to claim 1, wherein the weighting information is calculated on a basis of a determination result from the determining unit.

7. The image analysis device according to claim 1, wherein the at least one processor is further configured to cause the image analysis device to function as a detection unit configured to detect a position of a vehicle and an area of the vehicle from the image and to output a detection result, and
wherein the determining unit determines the parking situations of the plurality of parking areas on a basis of the weighting information and the detection result.

8. The image analysis device according to claim 7, wherein the determining unit calculates a determination score that is defined as a ratio of a sum of weights of overlapping areas of areas of side parts neighboring other parking areas in a range of a target parking area in the image and a detection area of the detection result and a sum of weights of areas of the side parts on a basis of the weighting information and the detection area and determines whether a vehicle is parked in the target parking area on a basis of the calculated determination score.

9. The image analysis device according to claim 7, wherein the weighting information is calculated on a basis of the detection result.

10. The image analysis device according to claim 7, wherein the determining unit determines a vehicle type of a vehicle parked in the target parking area.

11. The image analysis device according to claim 10, wherein the determining unit corrects at least one of height information and weight information of the target parking area according to the vehicle type.

12. The image analysis device according to claim 1, wherein the at least one processor is further configured to cause the image analysis device to function as a display control unit configured to display at least a setting screen for allowing a user to set the parking area or the determination result on a screen of a display device.

13. The image analysis device according to claim 1, wherein the at least one processor is further configured to cause the image analysis device to function as a storage unit configured to store the parking lot information.

14. An image analysis method of an image analysis device, the method comprising:
calculating a determination area having a hexahedral shape used to determine a parking situation of vehicles in a parking lot including a plurality of parking areas from an image for each parking area; and
determining a parking situation for each of the plurality of parking areas on a basis of the determination area, parking lot information on a neighboring relationship between the parking areas, and weighting information for weighting each of four surfaces adjacent to the neighboring parking areas, based on a parking situation of a parking area neighboring the parking area corresponding to the determination area.

15. A non-transitory computer-readable storage medium configured to store a computer program to control an image analysis device, wherein the computer program comprises instructions for executing following processes:
calculating a determination area having a hexahedral shape used to determine a parking situation of vehicles in a parking lot including a plurality of parking areas from an image for each parking area; and
determining a parking situation for each of the plurality of parking areas on a basis of the determination area, parking lot information on a neighboring relationship between the parking areas, and weighting information for weighting each of four surfaces adjacent to the neighboring parking areas, based on a parking situation of a parking area neighboring the parking area corresponding to the determination area.

* * * * *